United States Patent
Urano et al.

(10) Patent No.: US 10,982,642 B2
(45) Date of Patent: Apr. 20, 2021

(54) CONTROLLER FOR INTERNAL COMBUSTION ENGINE

(71) Applicant: TOYOTA JIDOSHA KABUSHIKI KAISHA, Toyota (JP)

(72) Inventors: Shigeyuki Urano, Mishima (JP); Kota Sata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/390,037

(22) Filed: Apr. 22, 2019

(65) Prior Publication Data

US 2019/0368460 A1 Dec. 5, 2019

(30) Foreign Application Priority Data

Jun. 1, 2018 (JP) .............................. JP2018-106051

(51) Int. Cl.
*F02P 5/15* (2006.01)
*F02P 5/152* (2006.01)
(Continued)

(52) U.S. Cl.
CPC ........ *F02P 5/1516* (2013.01); *F02D 41/0052* (2013.01); *F02D 41/0077* (2013.01);
(Continued)

(58) Field of Classification Search
CPC .......... F02P 5/1516; F02P 5/152; F02P 5/045; F02P 5/153; F02P 5/1502; F02M 26/00;
(Continued)

(56) References Cited

U.S. PATENT DOCUMENTS

2011/0166795 A1* 7/2011 Ohshima ............... F02D 41/123
702/22

FOREIGN PATENT DOCUMENTS

| JP | 2002-322938 | 11/2002 |
| JP | 2007-198313 | 8/2007 |
| JP | 2011-089470 | 5/2011 |

OTHER PUBLICATIONS

Jinwu Gao et al, "A statistical combustion phase control approach of SI engines", Mechanical Systems and Signal Processing, vol. 85, 2017, pp. 218-235.

(Continued)

*Primary Examiner* — Joseph J Dallo
*Assistant Examiner* — Scott A Reinbold
(74) *Attorney, Agent, or Firm* — Oblon, McClelland, Maier & Neustadt, L.L.P.

(57) ABSTRACT

Aspects of the disclosure are directed to controller for an internal combustion engine. The controller can, in each combustion cycle that composes a change cycle, calculate an average of control amounts from a first combustion cycle to an nth (1<=n<=N) combustion cycle and calculate an error of the average with respect to an average of a reference normal population. Further, the controller can set both a positive threshold and a negative threshold based on a standard error of the reference normal population in the case where the number of data is n. Subsequently, the controller can change the operation amount to make the error approach the positive threshold or the negative threshold when the error exceeds neither the positive threshold nor the negative threshold at any combustion cycle.

2 Claims, 8 Drawing Sheets

(51) Int. Cl.
    *F02P 5/04*           (2006.01)
    *F02M 26/00*        (2016.01)
    *F02D 41/00*        (2006.01)
    *F02P 5/153*        (2006.01)

(52) U.S. Cl.
    CPC .............. *F02M 26/00* (2016.02); *F02P 5/045* (2013.01); *F02P 5/152* (2013.01); *F02P 5/153* (2013.01); *F02M 2026/009* (2016.02)

(58) Field of Classification Search
    CPC .......... F02M 2026/009; F02D 41/0052; F02D 41/0077; F02D 35/028; F02D 37/02; F02D 35/023; F02D 41/2477; Y02T 10/40
    See application file for complete search history.

(56) References Cited

OTHER PUBLICATIONS

Jinwu Gao et al, "Combustion Phase Control of SI Gasoline Engines Using Hypothesis Test", The 4th IFAC Workshop on E-CoSM, 2015, pp. 153-158.
Jinwu Gao et al, "Experimental comparisons of hypothesis test and moving average based combustion phase controllers", ISA Transactions, vol. 65, 2016, pp. 504-515.

* cited by examiner

CONTROLLER FOR INTERNAL COMBUSTION ENGINE

CROSS-REFERENCE TO RELATED APPLICATION

This application claims priority to Japanese Patent Application No. 2018-106051, filed on Jun. 1, 2018, which is incorporated by reference herein in its entirety.

BACKGROUND

Field

The present disclosure relates to a controller for an internal combustion engine, especially a controller for an internal combustion engine that feeds back the fluctuation of a control amount to an operation amount by using a hypothesis test and a statistical decision.

Background Art

As a controlled object having stochastic dispersion, for example, combustion that is one of the controlled objects of an internal combustion engine can be exemplified. When feed-back control is applied to a control amount related to such a controlled object, the control has no choice but to be conservative to prevent overcontrolling caused by the dispersion of the controlled object. However, it is difficult to ensure quick response with respect to the fluctuation of the control amount by conservative control.

The fluctuation of the control amount is a fluctuation caused by stochastic dispersion that a system has inherently or a fluctuation caused by a factor other than a stochastic one. The fluctuation of the control amount that should be treated by the feed-back control is the latter one caused by the fluctuation of a condition of the controlled object. Therefore, for ensuring the quick response while preventing overcontrolling, it is required to determine whether the fluctuation of the control amount is the former one or the latter one. However, in general, a lot of data is needed to statistically make a determination of a cause of the fluctuation of the control amount. The accuracy of the determination improves as the number of data increases, but the quick response decreases because it takes time to collect data.

For increasing the quick response, it is need to execute a determination with as little data as possible. In this regard, in the following Non-patent Literature 1, a method of feed-backing the fluctuation of the control amount to an operation amount by using a hypothesis test and a statistical decision. Specifically, Non-patent Literature 1 discloses an application example of the hypothesis test and the statistical decision to the feed-back control for controlling the crank angle at which combustion pressure is maximized (hereinafter, referred to as "LPP") to a reference value.

If the expectation of LPP is equal to the reference value, a value obtained by dividing the deviation of the average of LPP from the reference value by the sampling error of the average (hereinafter, referred to as "Z") follows a standard normal distribution. If the data of LPP from the first cycle to the nth cycle is obtained, the average here is the average of n pieces of data from the first cycle to the nth cycle. Also, the sampling error of the average is obtained by dividing the standard deviation of LPP by the square root of the number of data.

Whether Z follows the standard normal distribution or not is determined by comparing Z with a threshold calculated from a significance level. If Z is not within a reliable range defined by a negative threshold and a positive threshold, it is determined that Z doesn't follow the standard normal distribution, that is, the expectation of LPP is not equal to the reference value. If Z is within the reliable range, it is determined that Z follows the standard normal distribution, that is, the expectation of LPP is equal to the reference value.

That the expectation of LPP is equal to the reference value means that the time-series fluctuation of LPP is a fluctuation caused by stochastic dispersion that a system has inherently. In the contrast, that the expectation of LPP is not equal to the reference value means that the time-series fluctuation of LPP is a fluctuation caused by a factor other than a stochastic one. Therefore, by calculating Z for each cycle and determining whether Z is within the reliable range, it becomes possible to determine whether or not the fluctuation of LPP is one that should be treated by the feed-back control, for each cycle.

According to the feed-back control disclosed specifically in Non-patent Literature 1, the value obtained by adding the product of the threshold and the standard error to the reference value of LPP is set as an upper limit of LPP, and, when the average of LPP exceeds the upper limit, an ignition timing is advanced. Also, the value obtained by subtracting the product of the threshold and the standard error from the reference value of LPP is set as a lower limit of LPP, and, when the average of LPP exceeds the lower limit, an ignition timing is retarded. According to the determination method disclosed in Non-patent Literature 1, it is possible to execute statistical determination without a lot of data. By conducting the feed-back control based on this determination, it is possible to prevent overcontrolling to the fluctuation of the control amount caused by stochastic dispersion and also ensure quick response with respect to the fluctuation of the control amount caused by a factor other than a stochastic one.

Patent Documents 1, 2, and 3 listed below are examples of documents showing the state of the art in the technical field to which the present disclosure relates.

Patent Document 1: JP2007-198313A
Patent Document 2: JP2002-322938A
Patent Document 3: JP2011-089470A
Non-patent Literature 1: Jinwu Gao, Yuhu Wu, Tielong Shen, A statistical combustion phase control approach of SI engines, Mechanical Systems and Signal Processing 85(2017) 218-235

SUMMARY

According to the method disclosed in Non-patent Literature 1, if the fluctuation of the control amount is caused by stochastic dispersion, changing the operation amount is not executed. This method prevents overcontrolling, but cannot optimize engine control within an allowable range of the dispersion of the control amount. As a specific example, when the introduced amount of EGR gas is smaller than a planned amount, the combustion fluctuation decreases and thereby the fluctuation of LPP decreases. As a result, when the average of LPP falls within the range from the lower limit to the upper limit, changing the ignition timing is not executed. However, from the viewpoint of improving fuel efficiency, even if combustion fluctuation is increased, it is preferable to open the EGR valve to increase the introduction amount of EGR gas as long as the combustion fluctuation is kept within an allowable range.

The present disclosure has been devised in view of such problems, and an object of the present disclosure is to prevent overcontrolling to the fluctuation of the control amount caused by stochastic dispersion, ensure quick response with respect to the fluctuation of the control amount caused by a factor other than a stochastic one, and also optimize engine control within an allowable range of the dispersion of the control amount.

The present disclosure provides a controller for an internal combustion engine. The controller according to the present disclosure comprises at least one processor and at least one memory coupled to the at least one processor. The at least one memory includes at least one computer-executable program that upon execution causes the at least one processor to execute control amount calculation processing and operation amount change processing. The control amount calculation processing is processing of calculating a control amount relating to combustion of the internal combustion engine for each combustion cycle, based on information from a sensor which detects the state of the internal combustion engine. The operation amount change processing is processing of changing an operation amount affecting the control amount for each change cycle, one change cycle consisting of N (2<=N) combustion cycles.

In the operation amount change processing, the at least one processor operates to choose the reference normal population of the control amount under the current operating condition of the internal combustion engine from a plurality of reference normal populations set for each operating condition of the internal combustion engine. Moreover, the at least one processor operates to execute, in each combustion cycle from the first combustion cycle to the Nth combustion cycle that composes the change cycle, average calculation processing, error calculation processing and threshold set processing. The average calculation processing is processing of calculating a n-cycle average that is the average of the control amounts from the first combustion cycle to the nth (1<=n<=N) combustion cycle. The error calculation processing is processing of calculating a n-cycle error that is the error of the n-cycle average with respect to the average of the reference normal population. The threshold set processing is processing of setting both a positive change determination threshold and a negative change determination threshold with respect to the n-cycle error, based on the standard error of the reference normal population in a case where the number of data is n. The at least one processor operates to change the operation amount to make the n-cycle error approach the positive change determination threshold or the negative change determination threshold, when the n-cycle error doesn't exceed the positive change determination threshold at any combustion cycle and doesn't exceed the negative change determination threshold at any combustion cycle. Note that, in this application, that the n-cycle error exceeds a threshold means that the magnitude of the n-cycle error exceeds the magnitude of the threshold.

The at least one processor may operate to, in the operation amount change processing, change the operation amount gradually by stepwise change to make the n-cycle error approach the positive change determination threshold or the negative change determination threshold.

The at least one processor may operate to, in the operation amount change processing, calculate an unbiased variance of the control amounts from the first combustion cycle to the Nth combustion cycle, when the n-cycle error doesn't exceed the positive change determination threshold at any combustion cycle and doesn't exceed the negative change determination threshold at any combustion cycle, and change the operation amount to make the n-cycle error approach the positive change determination threshold or the negative change determination threshold, when the unbiased variance is smaller than a variance of the reference normal population by a predetermined value or more.

The at least one processor may operate to, in the control amount calculation processing, calculate as the control amount a crank angle at which a combustion ratio becomes a predetermined ratio, based on information from a combustion pressure sensor. In this case, the at least one processor may operate to, in the operation amount change processing, change an opening of an EGR valve of the internal combustion engine to an open side, when the unbiased variance is smaller than the variance of the reference normal population by the predetermined value or more.

As configured as described above, the controller according to the present disclosure changes the operation amount affecting the control amount for each change cycle, one change cycle consisting of N combustion cycles. Specifically, the controller chooses the reference normal population of the control amount under the current operating condition of the internal combustion engine from the plurality of reference normal populations set for each operating condition of the internal combustion engine. Then, the controller, in each combustion cycle from the first combustion cycle to the Nth combustion cycle that composes the change cycle, calculates the n-cycle average that is the average of the control amounts from the first combustion cycle to the nth combustion cycle, calculates the n-cycle error that is the error of the n-cycle average with respect to the average of the reference normal population, and sets both the positive change determination threshold and the negative change determination threshold with respect to the n-cycle error, based on the standard error of the reference normal population in the case where the number of data is n. And then, the controller changes the operation amount to make the n-cycle error approach the positive change determination threshold or the negative change determination threshold, when the n-cycle error doesn't exceed the positive change determination threshold at any combustion cycle and doesn't exceed the negative change determination threshold at any combustion cycle.

According to the controller that operates as above, it is possible to prevent overcontrolling to the fluctuation of the control amount caused by stochastic dispersion, ensure quick response with respect to the fluctuation of the control amount caused by a factor other than a stochastic one, and also optimize engine control within an allowable range of the dispersion of the control amount.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly specified by the numerals theoretically. Furthermore, structures and steps that are described in the embodiment shown as follows are not always indispensable to the disclosure unless specially explicitly shown otherwise, or unless the disclosure is explicitly specified by the structures or the steps theoretically.

First Embodiment

Figure 1:
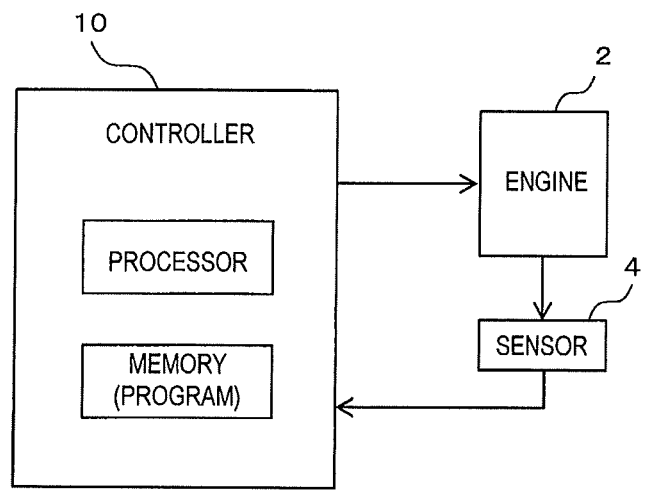
FIG. 1 is a block diagram showing a configuration of an engine control system according to the first embodiment of the present disclosure.

FIG. 1 is a block diagram showing a configuration of an engine control system according to the first embodiment of the present disclosure. The control system is used for an engine (internal combustion engine) 2 mounted on an automobile and the like, and comprises at least an engine 2, a plurality of sensors 4 for detecting conditions of the engine 2 and a controller 10 for controlling the engine 2.

The engine 2 is, for example, a spark-ignition internal combustion engine fueled by gasoline. The engine 4 comprises an ignition system that can adjust an ignition timing with the energization period of an ignition coil, and an EGR system that can adjust an introducing amount of EGR gas with the opening of an EGR valve. The plurality of sensors 4 include at least a combustion pressure sensor and a crank angle sensor. The combustion pressure sensor is installed in each cylinder of the engine 2 and outputs a signal corresponding to a combustion pressure in a combustion chamber. The crank angle sensor outputs a signal corresponding to a crank angle of the engine 2. The controller 10 receives the signal of the sensor 4 and calculates a control amount of the engine 2 based on information included in the signal of the sensor 4. The controller 10 includes at least one memory and at least one processor as physical configurations. The at least one memory stores at least one program for engine control, and the at least one processor reads and executes the at least one program from the at least one memory.

Figure 2:
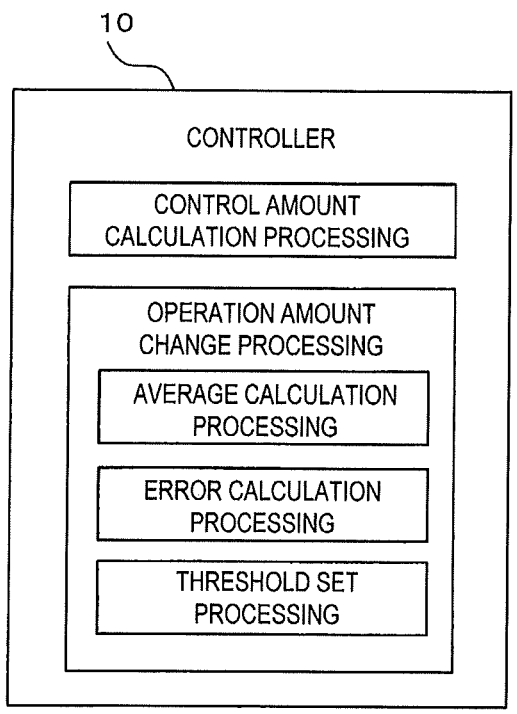
FIG. 2 is a block diagram showing processing executed by a controller according to the first embodiment of the present disclosure.

FIG. 2 is a block diagram showing part of the processing executed by the controller 10. Processing related to the determination to change the operation amount of the engine 2 is extracted among different kinds of processing executed by the controller 10, and expressed with blocks in FIG. 2. As shown in FIG. 2, the processing executed by the controller 10 includes control amount calculation processing and operation amount change processing. The operation amount change processing includes average calculation processing, error calculation processing and threshold set processing. For the determination to change the operation amount, a hypothesis test and a statistical decision is used as described below. Hereinafter, with reference to FIGS. 3 to 8, the hypothesis test and the statistical decision will be described together with the contents of each processing.

The controller 10 calculates a control amount related to combustion of the engine 2 in the control amount calculation processing. The control amount related to combustion of the engine 2 calculated in the present embodiment is CA50. CA50 means the crank angle at which combustion ratio becomes 50%. The combustion ratio is also referred to as combustion mass ratio, which means the ratio of burnt mass to mass of fuel per combustion supplied to the combustion chamber. The combustion ratio at an arbitrary crank angle can be calculated as the ratio of the heat release at the arbitrary crank angle to the final total heat release. The heat release is the total amount of the heat generated in the combustion chamber from the start of the combustion in one combustion cycle. Therefore, the heat release at an arbitrary crank angle is calculated by integrating the heat release rate calculated for each unit crank angle, with the section from the combustion start angle to the arbitrary crank angle as an integration section. The heat release rate is the amount of heat per unit crank angle generated in the combustion chamber, and can be calculated from the pressure in the combustion chamber measured by the combustion pressure sensor. The controller 10 calculates CA50 for each combustion cycle in the control amount calculation processing.

Since the engine 2 has an individual difference and aged deterioration, CA 50 has dispersion for each combustion cycle even if the operation amount is the same. However, the dispersion includes dispersion that occurs even with a reference engine having the specifications as designed. The dispersion of CA 50 per combustion cycle that occurs in the reference engine is stochastic dispersion according to the normal distribution. Here, data of CA 50 obtained from the reference engine is referred to as "reference normal population". The reference normal population is created, for example, for each operating condition defined by engine speed and engine load.

The average of CA 50 from the first cycle to the nth cycle obtained in the engine is referred to as "n-cycle average" and is represented by "$\mu_n$". The processing of calculating the n-cycle average $\mu_n$ is the average calculation processing. Further, the average of the reference normal population is denoted by "$\mu_o$", and the standard deviation of the reference normal population is denoted by "$\sigma_o$". Building a null hypothesis that the n-cycle average $\mu_n$ of CA 50 is equal to the average $\mu_o$ of the reference normal population, if this null hypothesis is true, data Z calculated by the following equation follows a standard normal distribution according to the number n of data.

$$Z = \frac{|\mu_n - \mu_o|}{\sigma_o / \sqrt{n}} \sim N(0, 1)$$

When a significance level is denoted by "$\alpha$" and a critical value for the data Z is denoted by "$Z_{\alpha/2}$", the critical value $Z_{\alpha/2}$ can be calculated by the following equation. However, the significance level $\alpha$ is a numerical value determined by adaptation at the time of design.

$$1 - \alpha = \int_{-Z_{\alpha/2}}^{Z_{\alpha/2}} \frac{1}{2\pi} \exp\left(-\frac{Z^2}{2}\right) dZ$$

The error $\mu_n - \mu_o$ of the n-cycle average $\mu_n$ with respect to the average $\mu_o$ of the reference normal population is referred to as "n-cycle error". The processing of calculating the n-cycle error is the error calculation processing. If the dispersion of CA 50 in the engine 2 for each combustion cycle is stochastic dispersion in accordance with the normal distribution, the following equation is established for the n-cycle error. In the following equation, $\sigma_o/n^{1/2}$ is a standard error of the reference normal population when there are n number of data. The value obtained by multiplying the standard error $\sigma_o/n^{1/2}$ by the negative critical value $Z_{\alpha/2}$ is the negative threshold of the n-cycle error, and the value obtained by multiplying the standard error $\sigma_o/n^{1/2}$ by the positive critical value $Z_{\alpha/2}$ is the positive threshold of the n-cycle error. The processing of setting these thresholds is the threshold set processing. If the following equation is not established, it means that the fluctuation of CA 50 includes a fluctuation caused by a factor other than a stochastic one.

$$-\frac{Z_{\alpha/2}\sigma_o}{\sqrt{n}} \leq \mu_n - \mu_o \leq \frac{Z_{\alpha/2}\sigma_o}{\sqrt{n}}$$

Figure 3:
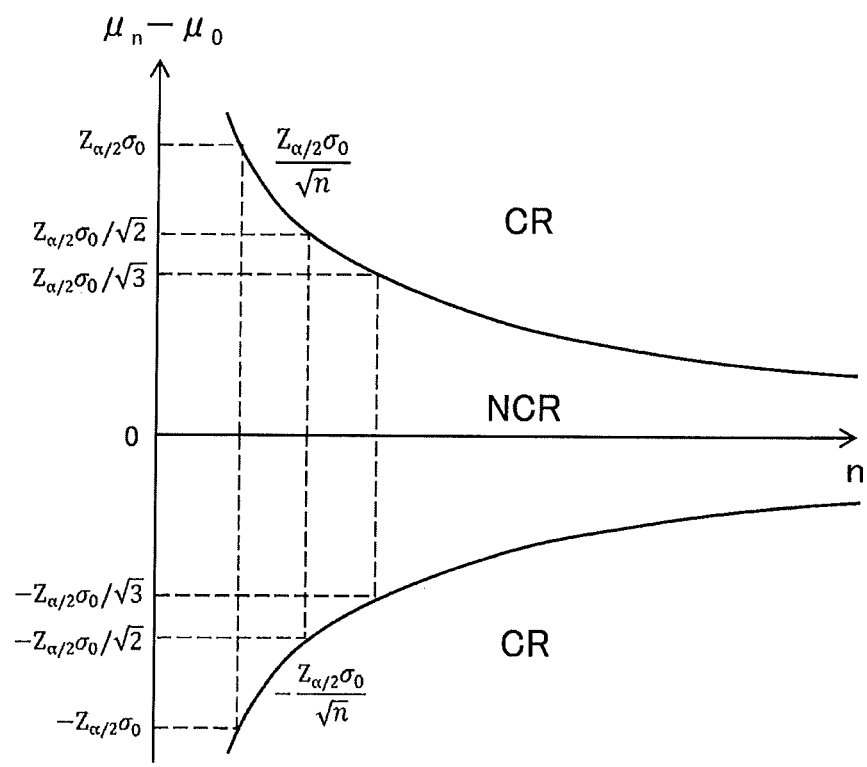
FIG. 3 is a diagram for illustrating a hypothesis test according to the first embodiment of the present disclosure.

FIG. 3 is a graph showing the above equation. In this graph, the curve drawn in the region where the n-cycle error is positive is a curve showing a series of $Z_{\alpha/2}*\sigma_o/n^{1/2}$, which is the positive threshold of the above equation, and the curve drawn in the region where the n-cycle error is negative is a curve showing a series of $-Z_{\alpha/2}*\sigma_o/n^{1/2}$, which is the negative threshold of the above equation. The region of the n-cycle error from the negative threshold to the positive threshold is referred to as "Non Critical Region", and is denoted by "NCR" in FIG. 3. Also, the region of the n-cycle error outside the negative threshold and the region of the n-cycle error outside the positive threshold are referred to as "Critical Region", and are denoted by "CR" in FIG. 3. According to the central limit theorem, NCR becomes narrower as the number n of data becomes larger. This means that, when the number n of data is small, a large error is allowed, but an allowable error becomes smaller as the number n of data becomes larger.

Figure 4:
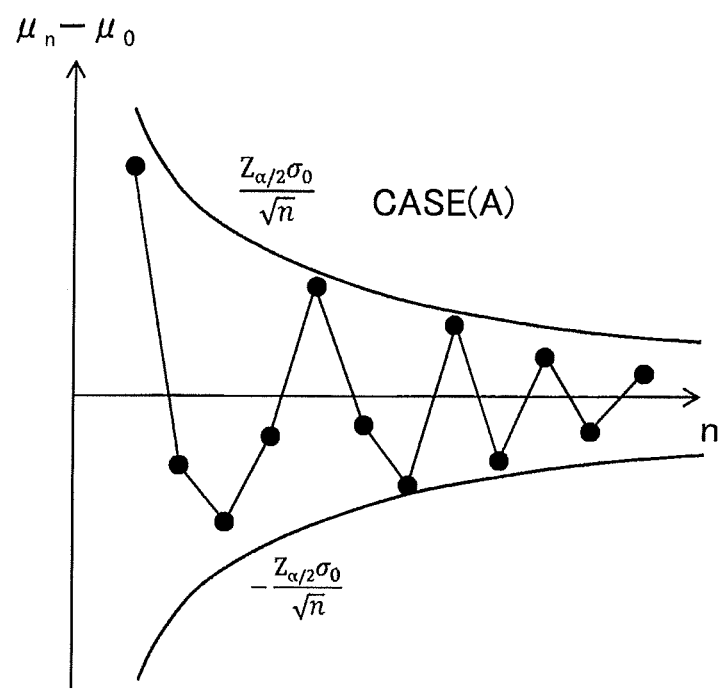
FIG. 4 is a diagram showing an example of the result of the hypothesis test according to the first embodiment of the present disclosure.

FIGS. 4 to 7 are diagrams showing examples of the result of the hypothesis test according to the present embodiment. In each figure, the black circles represent the n-cycle error data calculated for each combustion cycle. FIG. 4 shows an example in which the n-cycle error is within the range from the negative threshold to the positive threshold at all the combustion cycles. This kind of example is referred to as "CASE (A)".

Figure 5:
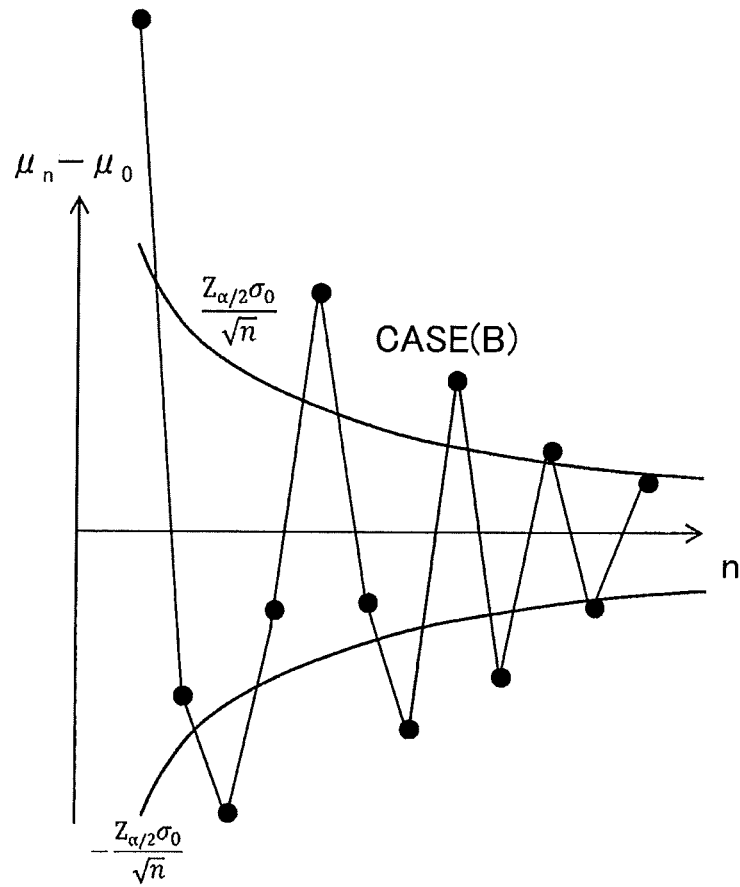
FIG. 5 is a diagram showing an example of the result of the hypothesis test according to the first embodiment of the present disclosure.

FIG. 5 shows an example in which the n-cycle error exceeds the positive threshold at some combustion cycles and exceeds the negative threshold at another combustion cycles. This kind of example is referred to as "CASE (B)".

Figure 6:
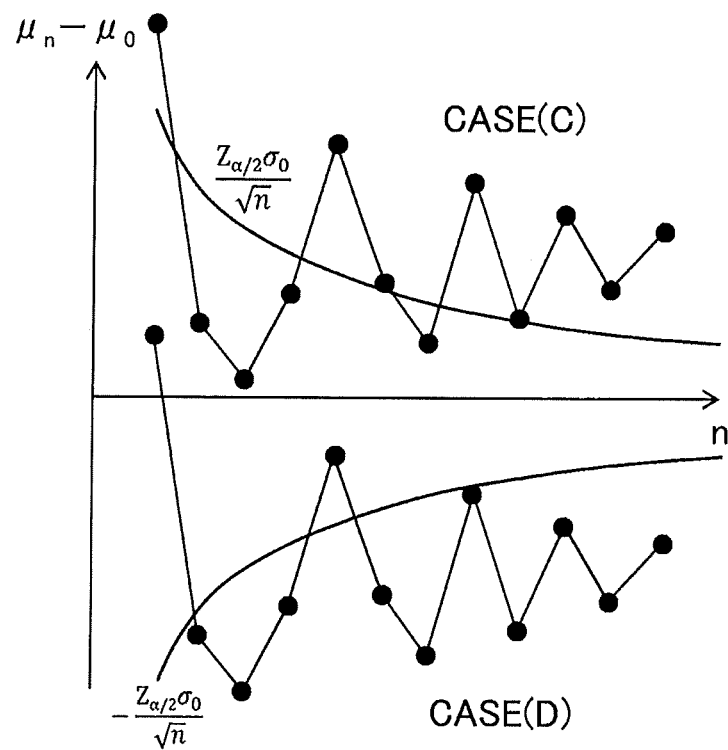
FIG. 6 is a diagram showing an example of the result of the hypothesis test according to the first embodiment of the present disclosure.

FIG. 6 shows an example in which the n-cycle error exceeds the positive threshold at some combustion cycles and doesn't exceed the negative threshold at any combustion cycle, and an example in which the n-cycle error exceeds the negative threshold at some combustion cycles and doesn't exceed the positive threshold at any combustion cycle. The former example is referred to as "CASE (C)", and the latter example is referred to as "CASE (D)".

Figure 7:
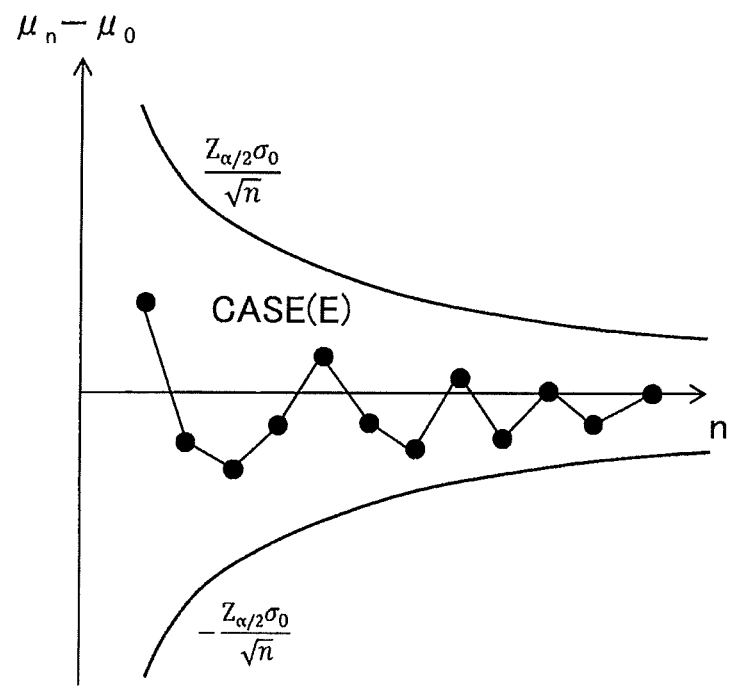
FIG. 7 is a diagram showing an example of the result of the hypothesis test according to the first embodiment of the present disclosure.

FIG. 7 shows an example similar to CASE (A), in which the n-cycle error is within the range from the negative threshold to the positive threshold at all the combustion cycles. However, in this example, the variance of the n-cycle error is small compared to CASE (A), and the margins of the n-cycle error with respect to the positive threshold and the negative thresholds are large. This kind of example is referred to as "CASE (E)".

In the case of CASE (A), as the fluctuation of CA50 is caused by stochastic dispersion, a statistical decision that it is not necessary to change the operation amount can be made. On the contrary, in the case of CASE (B), CASE (C) and CASE (D), as the fluctuation of CA50 includes a factor other than a stochastic one, a statistical decision that it is better to change the operation amount can be made. The controller 50 changes the operation amount affecting CA50 in accordance with such a statistical decision.

The operation amount affecting CA50 includes at least an ignition timing and an EGR valve opening. When the dispersion of the n-cycle average $\mu_n$ with respect to the average $\mu_o$ of the reference normal population is large as CASE (B), it is assumed that large combustion fluctuation is happening. Therefore, as a countermeasure for CASE (B), the EGR valve opening is changed to the close side to reduce an EGR rate.

When the n-cycle average $\mu_n$ deviates to the positive side as a whole with respect to the average $\mu_o$ of the reference normal population as CASE (C), it is assumed that the ignition timing is excessively retarded. Therefore, as a countermeasure for CASE (C), the ignition timing is changed to the advance side. On the contrary, when the n-cycle average $\mu_n$ deviates to the negative side as a whole with respect to the average $\mu_o$ of the reference normal population as CASE (D), it is assumed that the ignition timing is excessively advanced. Therefore, as a countermeasure for CASE (D), the ignition timing is changed to the retardation side.

As CASE (E) is included in the case of CASE (A), there is no need to change the operation amount in order to cope with the fluctuation of CA50 caused by a factor other than a stochastic one. However, stochastic dispersion in CASE (E) is small compared to the reference normal population, so a statistical decision that it is better to change the operation amount can be made. If there is room to optimize the control by changing the operation amount, even if the dispersion of CA 50 is increased, it is preferable to change the operation amount as long as the dispersion is kept within an allowable range.

Specifically, when the introduced amount of EGR gas is smaller than a planned amount, combustion fluctuation is decreased, and thereby the dispersion of CA 50 is decreased as in the case of CASE (E). However, from the viewpoint of improving fuel efficiency, even if combustion fluctuation is increased, it is preferable to open the EGR valve to increase the introduction amount of EGR gas. Therefore, in the case of CASE (E), the introduction amount of EGR gas is increased by changing the EGR valve opening to the open side by a predetermined amount.

Figure 8:
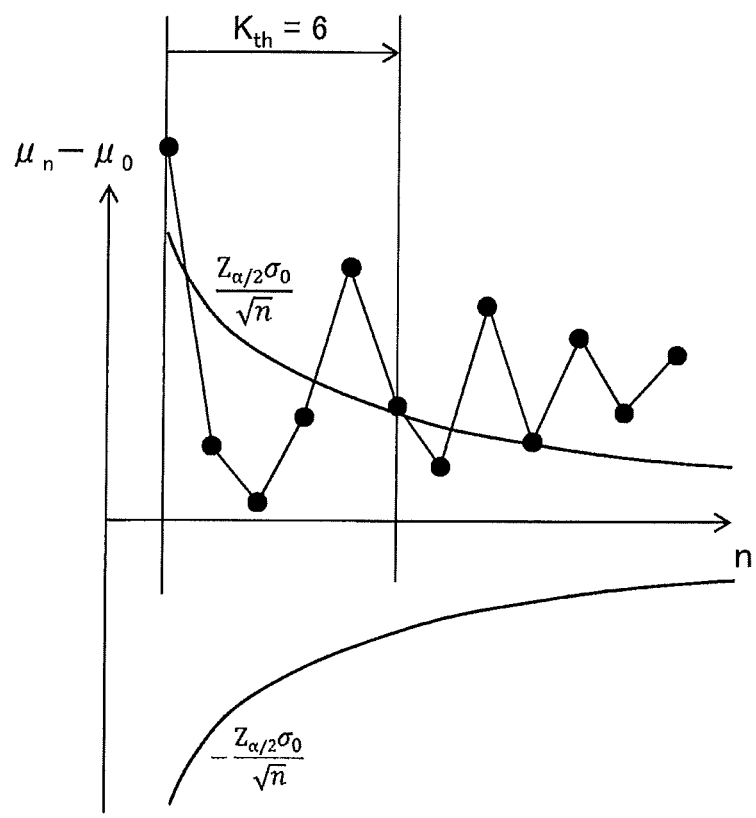
FIG. 8 is a diagram for illustrating a change cycle at which an operation amount is changed.

By the way, it is rare for the engine 2 to keep operating at a constant operating condition, and the operating condition fluctuates frequently. If the operating condition fluctuates, the reference normal population is changed, so the number of data of the n-cycle average $\mu_n$ cannot be continuously increased. However, according to the central limit theorem, the statistical decision can be made even from a small number of data. In the present embodiment, as shown in FIG. 8, the combustion cycles for collecting data are limited to a predetermined number N of cycles (N is an integer of 2 or more, for example, 6), and the above-described statistical decision is made every predetermined number N of cycles. In other words, the controller 10, in the operation amount change processing, changes the ignition timing or the EGR valve opening for each change cycle, one change cycle consisting of N combustion cycles.

In summary, the controller 10 executes the operation amount change processing in the following procedure. First, the controller 10 chooses the reference normal population of CA50 under the current operating condition of the engine 2 among a plurality of reference normal populations set for each operating condition of the engine 2. Then, the controller 10 executes the average calculation processing, the error calculation processing, and the threshold set processing in each combustion cycle from the first combustion cycle to the Nth combustion cycle that composes the change cycle.

In the average calculation processing, the controller 10 calculates the n-cycle average $\mu_n$ that is the average of CA50 from the first combustion cycle to the nth ($1 \leq n \leq N$) combustion cycle. In the error calculation processing, the controller 10 calculates the n-cycle error that is the error of the average $\mu_n$ with respect to the average $\mu_o$ of the reference normal population. Then, in the threshold set processing, the controller 10 sets both the positive threshold $Z_{\alpha/2} * \sigma_o / n^{1/2}$ and the negative threshold $-Z_{\alpha/2} * \sigma_o / n^{1/2}$ with respect to the n-cycle error based on the standard error of the reference normal population in the case where the number of data is n. These thresholds are thresholds for determining whether to change the operation amount, and corresponds to the change determination threshold defined in claims.

After the above processing, the controller 10 compares the series of the n-cycle errors from the first combustion cycle to the Nth combustion cycle and the series of the positive thresholds from the first combustion cycle to the Nth combustion cycle. Also, the controller 10 compares the series of the n-cycle errors from the first combustion cycle to the Nth combustion cycle and the series of the negative thresholds from the first combustion cycle to the Nth combustion cycle. Then, the controller 10 determines which of CASE (A), CASE (B), CASE (C), CASE (D) and CASE (E) these comparison results apply to, and chooses the operation amount to be changed between the ignition timing and the EGR valve opening.

Figure 9:
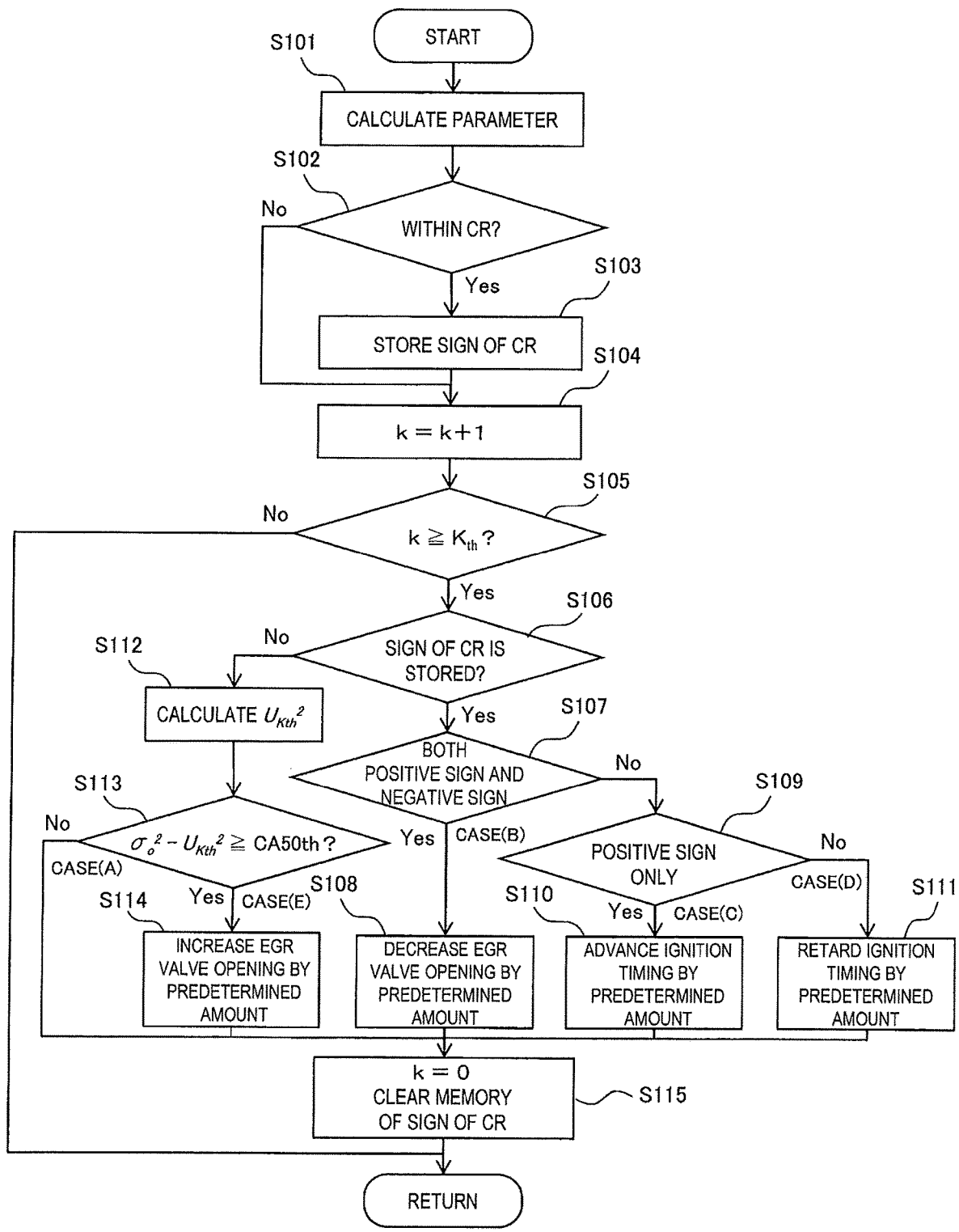
FIG. 9 is a flowchart showing a control flow of engine control according to the first embodiment of the present disclosure.

The above described processing of the controller 10 is executed as part of engine control by the controller 10. FIG. 9 is a flowchart showing a control flow of the engine control according to the present embodiment. The controller 10 executes calculation processing shown in the flowchart at every combustion cycle. Hereinafter, the control flow of the engine control according to the present embodiment will be described along the flowchart. In the control flow, the number of combustion cycles composing the change cycle is set to $K_{th}$.

First, in step S101, the controller 10 calculates parameters required for the hypothesis test. Specifically, the controller 10 calculates the n-cycle error by the average calculation processing and the error calculation processing, and sets the positive and negative thresholds with respect to the n-cycle error by the threshold set processing.

In step S102, the controller 10 determines whether or not the n-cycle error is within CR, based on a comparison between the n-cycle error and the positive threshold and a comparison between the n-cycle error and the negative threshold. As shown in FIG. 3, CR exists on both the positive side and the negative side with respect to NCR. When the n-cycle error is within any one of CR on the positive side and CR on the negative side, the control flow proceeds to step S103. In step S103, the controller 10 stores the sign of CR containing the n-cycle error. If the n-cycle error is outside CR, the processing in step S103 is skipped.

In step S104, the controller 10 increments a counter value k for counting the number of combustion cycles by 1. In step S105, the controller 10 determines whether or not the counter value k reaches the number $K_{th}$ of combustion cycles composing the change cycle. When the counter value k does not reach the number $K_{th}$ of combustion cycles, all processing in the remaining steps is skipped.

When the counter value k reaches the number $K_{th}$ of combustion cycles, the controller 10 executes a determination in step S106. In step S106, the controller 10 determines whether or not the sign of CR is stored. If the sign of CR is not stored, this means that all the n-cycle errors from the first cycle to the $K_{th}$th cycle are within NCR. This corresponds to CASE (A) shown in FIG. 4 or CASE (E) shown in FIG. 7.

If the result of the determination in step S106 is negative, the control flow proceeds to step S112. In step S112, the controller 10 calculates the unbiased variance $U_{Kth}^2$ of CA50 based on the average $\mu_{th}$ of CA50 from the first combustion cycle to the $K_{th}$th combustion cycle. However, the variance $\sigma_{Kth}^2$ may be calculated instead of the unbiased variance $U_{Kth}^2$.

Next, in step S113, the controller 10 compares the unbiased variance $U_{Kth}^2$ calculated in step S112 with the variance $\sigma_o^2$ of the reference normal population, and determines whether or not the actual unbiased variance $U_{Kth}^2$ of CA50 becomes smaller than the variance $\sigma_o^2$ of the reference normal population by a predetermined value CA50th or more. The predetermined value CA50th is a numeral larger than zero, and can be set arbitrarily. If the result of the determination in step S113 is negative, this corresponds to CASE (A) shown in FIG. 4. In this case, the control flow skips step S114 to proceed to step S115.

If the result of the determination in step S113 is positive, this corresponds to CASE (E) shown in FIG. 7. In this case, the control flow proceeds to step S114. In step S114, the controller 10 changes the EGR valve opening to the open side so that the unbiased variance $U_{Kth}^2$ approaches the variance $\sigma_o^2$ of the reference normal population. Specifically, the memory of the controller 10 stores a map that relates an EGR valve opening to an operating condition of the engine 2 and a request for the engine 2. In step S114, the value of the EGR valve opening stored in the map is changed according to the difference between the unbiased variance $U_{Kth}^2$ and the variance $\sigma_o^2$. Note that the EGR valve opening may be gradually changed by stepwise change every change cycle, or may be changed all at once in one change cycle by an amount corresponding to the difference between the unbiased variance $U_{Kth}^2$ and the variance $\sigma_o^2$.

If the result of the determination in step S106 is positive, the controller 10 executes a determination in step S107. In step S107, the controller 10 determines whether or not the stored sign of CR includes both the positive sign and the negative sign. If both the positive sign and the negative sign are included, this corresponds to CASE (B) shown in FIG. 5. In this case, the control flow proceeds to step S108. In step S108, the controller 10 decreases the EGR valve opening by a predetermined amount.

According to this control flow, if the n-cycle error exceeds each of the negative threshold and the positive threshold even once, the EGR valve opening is decreased by the predetermined amount. However, the EGR valve opening may be decreased with a condition that the n-cycle error exceeds the positive threshold at a plurality of combustion cycles, and the n-cycle error exceeds the negative threshold at a plurality of combustion cycles. Further, the decreasing amount of the EGR valve opening is fixed in this control flow, but the decreasing amount may be increased according to the number of times the n-cycle error exceeds the threshold.

When the stored sign of CR includes any one of the positive sign and the negative sign, the controller 10 executes a determination in step S109. In step S109, the controller 10 determines whether or not the stored sign of CR is the positive sign only. If the stored sign of CR is the positive sign only, this corresponds to CASE (C) shown in FIG. 6. In this case, the control flow proceeds to step S110. In step S110, the controller 10 advances the ignition timing by a predetermined amount.

According to this control flow, if the n-cycle error exceeds the positive threshold even once, the ignition timing is advanced by the predetermined amount. However, the ignition timing may be advanced with a condition that the n-cycle error exceeds the positive threshold at a plurality of combustion cycles. Further, the advancing amount of the ignition timing is fixed in this control flow, but the advancing amount may be increased according to the number of times the n-cycle error exceeds the positive threshold.

If the result of the determination in step S109 is negative, that is, the stored sign of CR is the negative sign only, this corresponds to CASE (D) shown in FIG. 6. In this case, the control flow proceeds to step S111. In step S111, the controller 10 retards the ignition timing by a predetermined amount.

According to this control flow, if the n-cycle error exceeds the negative threshold even once, the ignition timing is retarded by the predetermined amount. However, the ignition timing may be retarded with a condition that the n-cycle error exceeds the negative threshold at a plurality of combustion cycles. Further, the retarding amount of the ignition timing is fixed in this control flow, but the retarding amount may be increased according to the number of times the n-cycle error exceeds the negative threshold.

After the processing in step S108, S110, S111 or S114, the control flow proceeds to step S115. In step S115, the controller 10 resets the counter value k to zero and clears the memory of the sign of CR. Further, the controller 10 chooses the reference normal population matching the current operating condition of the engine 2 from the plurality of reference normal populations set for each operating condition of engine 2, and updates the average and standard deviation of the reference normal population.

Other Embodiments

CA 50 is an example of the control amount related to combustion. The crank angle at which combustion ratio becomes a predetermined ratio other than 50 percent may be used as the control amount.

As another embodiment of the control amount calculation processing, the controller 10 may calculate the crank angle at which combustion pressure is maximized, that is, LPP as the control amount, based on information from a combustion pressure sensor. LPP is one of the control amounts related to combustion. In one example of the operation amount change processing when using LPP as the control amount, when the n-cycle error doesn't exceed the positive change determination threshold at any combustion cycle, and doesn't exceed the negative change determination threshold at any combustion cycle, the controller 10 changes the EGR valve opening to the open side. Specifically, when the unbiased variance of LPP from the first combustion cycle to the Nth combustion cycle is smaller than the variance of the reference normal population by a predetermined value or more, the controller 10 changes the EGR valve opening to the open side.

As yet another embodiment of the control amount calculation processing, the controller 10 may calculate the crank angle at which knocking starts or the crank angle at which knocking becomes the maximum as the control amount, based on information from a knock sensor. Both the knocking start crank angle and the knocking maximum crank angle are ones of the control amounts related to combustion. In one example of the operation amount change processing when using the knocking start crank angle or the knocking maximum crank angle as the control amount, when the n-cycle error doesn't exceed the positive change determination threshold at any combustion cycle, and doesn't exceed the negative change determination threshold at any combustion cycle, the controller 10 changes the EGR valve opening to the open side. Specifically, when the unbiased variance of the knocking start crank angles or the knocking maximum crank angles from the first combustion cycle to the Nth combustion cycle is smaller than the variance of the reference normal population by a predetermined value or more, the controller 10 changes the EGR valve opening to the open side.

As yet another embodiment of the control amount calculation processing, the controller 10 may calculate a knock strength or its logarithm value as the control amount, based on information from a knock sensor. The knocking strength is the maximum amplitude of knocking. The knock strength and its logarithm value are ones of the control amounts related to combustion. In the operation amount change processing when using a physical quantity representing the knock intensity or its logarithmic value as the control amount, when the n-cycle error doesn't exceed the positive change determination threshold at any combustion cycle, and doesn't exceed the negative change determination threshold at any combustion cycle, the controller 10 changes the cooling water temperature of the engine 2 to the high temperature side (for example, from 80° C. to 90° C.). Specifically, when the unbiased variance of the knock intensities or its logarithmic values from the first combustion cycle to the Nth combustion cycle is smaller than the variance of the reference normal population by a predetermined value or more, the controller 10 changes the coolant temperature of the engine 2 to the high temperature side. This processing is especially effective when the coolant temperature is lowered to suppress knocking.

The present disclosure is also applicable to a controller for a compression self-ignition engine. In this case, CA 50 or LPP can be used as the control amount. As the operation amount, a fuel injection timing, an EGR valve opening and the like can be used.

What is claimed is:

1. A controller for an internal combustion engine comprising:
    at least one processor; and
    at least one memory coupled to the at least one processor, the at least one memory including at least one computer-executable program that upon execution causes the at least one processor to execute;
    control amount calculation processing of calculating a control amount relating to combustion of the internal combustion engine for each combustion cycle, based on information from a sensor which detects a state of the internal combustion engine; and
    operation amount change processing of changing an operation amount affecting the control amount for each change cycle, one change cycle consisting of N combustion cycles, where N is greater than or equal to 2;
    wherein, in the operation amount change processing, the at least one processor operates to:
        choose a reference normal population of the control amount under a current operating condition of the internal combustion engine from a plurality of reference normal populations set for each operating condition of the internal combustion engine;

execute, in each combustion cycle from a first combustion cycle to an Nth combustion cycle that composes the change cycle, average calculation processing of calculating a n-cycle average that is an average of the control amounts from the first combustion cycle to an nth combustion cycle, where n is greater than or equal to 1 and less than or equal to N error calculation processing of calculating an n-cycle error that is an error of the n-cycle average with respect to an average of the reference normal population, and threshold set processing of setting both a positive change determination threshold and a negative change determination threshold with respect to the n-cycle error, based on a standard error of the reference normal population in a case where number of data is n, change the operation amount to make the n-cycle error approach the positive change determination threshold or the negative change determination threshold, when the n-cycle error doesn't exceed the positive change determination threshold at any combustion cycle and doesn't exceed the negative change determination threshold at any combustion cycle, calculate an unbiased variance of the control amounts from the first combustion cycle to the Nth combustion cycle, when the n-cycle error doesn't exceed the positive change determination threshold at any combustion cycle and doesn't exceed the negative change determination threshold at any combustion cycle, and change the operation amount to make the n-cycle error approach the positive change determination threshold or the negative change determination threshold, when the unbiased variance is smaller than a variance of the reference normal population by a predetermined value or more, and further wherein the at least one processor operates to:

in the control amount calculation processing, calculate as the control amount a crank angle at which a combustion ratio becomes a predetermined ratio, based on information from a combustion pressure sensor, and in the operation amount change processing, change an opening of an EGR valve of the internal combustion engine to an open side, when the unbiased variance is smaller than the variance of the reference normal population by the predetermined value or more.

2. The controller according to claim 1, wherein the at least one processor operates to, in the operation amount change processing, change the operation amount gradually by stepwise change to make the n-cycle error approach the positive change determination threshold or the negative change determination threshold.

* * * * *